United States Patent Office.

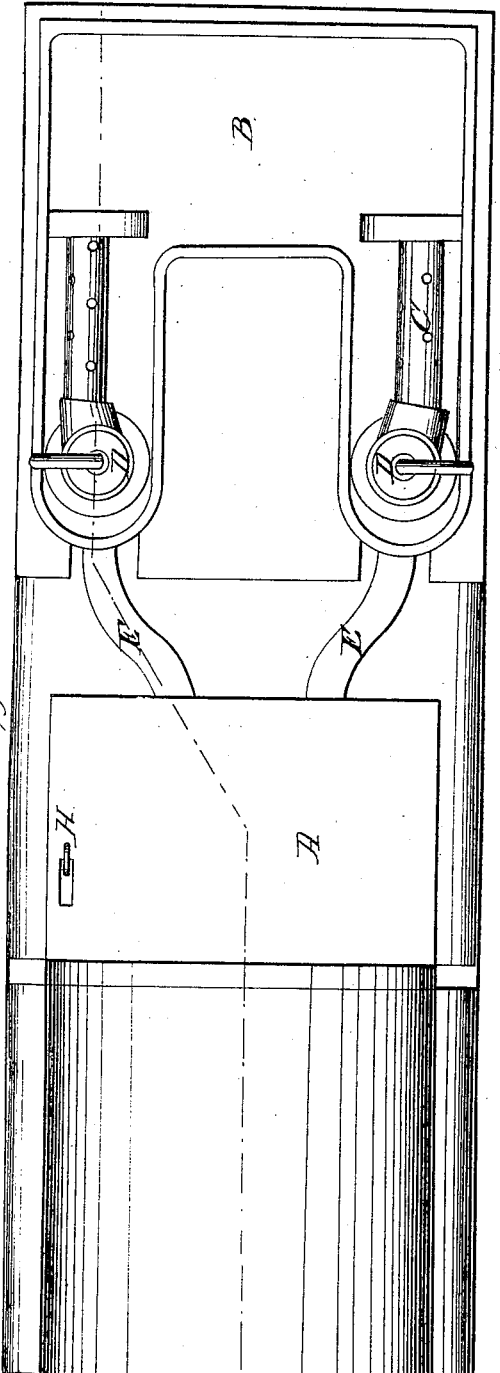
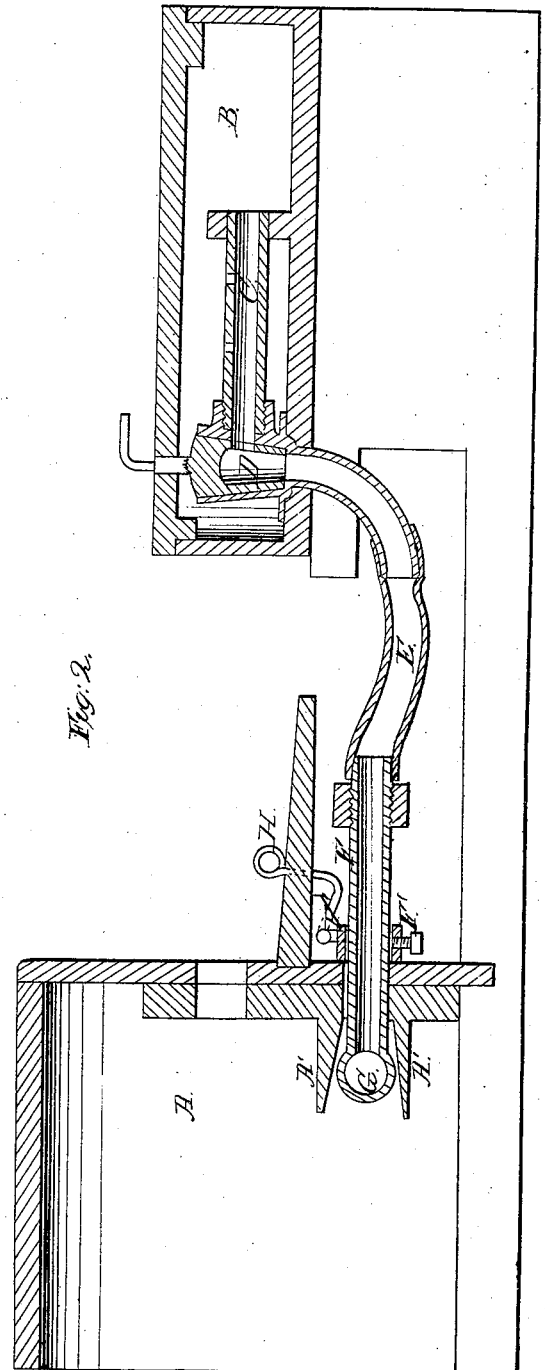

CHARLES WEBSTER, OF NEW HAVEN, VERMONT.

Letters Patent No. 76,961, dated April 21, 1868.

IMPROVEMENT IN FEED-WATER HEATERS FOR BOILERS.

The Schedule referred to in these Letters Patent and making part of the same.

TO ALL WHOM IT MAY CONCERN:

Be it known that I, CHARLES WEBSTER, of New Haven, in the county of Addison, and State of Vermont, have invented a new and useful Improvement in Heating Feed-Water for Steam-Generators; and I do hereby declare that the following is a full, clear, and exact description of the same, reference being had to the annexed drawings, making part of this specification, in which—

Figure 1 is a plan, and

Figure 2 is a vertical longitudinal section.

The same letters indicate the same parts in both figures.

In the annexed drawings, A is the fire-box of a steam-generator, and B a tank for containing the feed-water. C C are horizontal metallic pipes, placed in the tank, the flow of water through said pipes being regulated by the valve D at will. These pipes are connected with the pipes F F by elastic sections of pipes E E, which may be of India rubber or other suitable material. The pipes F F are attached near the ends of the heater G, which is a cast-iron retort, inserted in the fire-box. Collars, $F^1$, are attached to the pipes F by set-screws, which are connected by rods to the crank H', operated by the lever H. As this lever is moved, the retort G will be forced into or withdrawn from the fire, entering between the wings A', which project from each side of the fire-box, above and below the retort, and thus place the degree of heat to which the water in the retort shall be subjected, entirely within the control of the engineer. The water, when it has filled the retort, will be heated, and the force of the steam generated therein will expel the heated water, and permit colder water to flow in from the tank, thus maintaining a free circulation, through the tank, pipes, and heater.

What I claim as my invention, and desire to secure by Letters Patent, is—

An apparatus for heating the feed-water of a steam-generator, combining the following elements, viz, a tank B, and a system of pipes, connecting it with a heater, G, so arranged that the latter may be adjusted in its position in the fire-box, substantially as set forth.

In testimony whereof, I have signed my name to this specification in the presence of two subscribing witnesses.

CHARLES WEBSTER.

Witnesses:
JOHN D. BLOOR,
JOHN S. HOLLINGSHEAD.